United States Patent [19]

Bäuml et al.

[11] 4,137,823

[45] Feb. 6, 1979

[54] METHOD OF MACHINING WINDING SLOTS OF GENERATOR ROTORS

[75] Inventors: Kurt Bäuml, Nürtingen; Otto C. Gunsser, Zizishausen; Rudolf K. Lohse, Nürtingen, all of Fed. Rep. of Germany

[73] Assignee: Gebruder Heller Machinenfabrik GmbH, Nürtingen, Fed. Rep. of Germany

[21] Appl. No.: 826,339

[22] Filed: Aug. 22, 1977

Related U.S. Application Data

[62] Division of Ser. No. 560,177, Mar. 19, 1975, Pat. No. 4,056,039.

[51] Int. Cl.² ............................................. B23D 37/06
[52] U.S. Cl. ............................................................ 90/64
[58] Field of Search .................. 90/92, 63, 64, 91, 95; 29/30, 598

[56] References Cited

U.S. PATENT DOCUMENTS

| 1,684,140 | 9/1928 | Perkins et al. | 90/92 |
| 2,749,451 | 5/1956 | Lee | 90/91 |
| 2,925,019 | 2/1960 | Gotberg et al. | 90/63 |

*Primary Examiner*—John Sipos
*Attorney, Agent, or Firm*—Limbach, Limbach & Sutton

[57] ABSTRACT

Winding slots in generator rotors which are cut out of the solid rotor block by means of a side mill cutter are finish machined by means of a tool having a plurality of cutting edges disposed linearly one behind the other and displaced with respect to each other by one depth of cut which is guided repetitively, linearly over the slot wall with the depth the tool extends into the slot as well as the depth the tool penetrates vertically into the slot walls being controlled by copying means.

1 Claim, 12 Drawing Figures

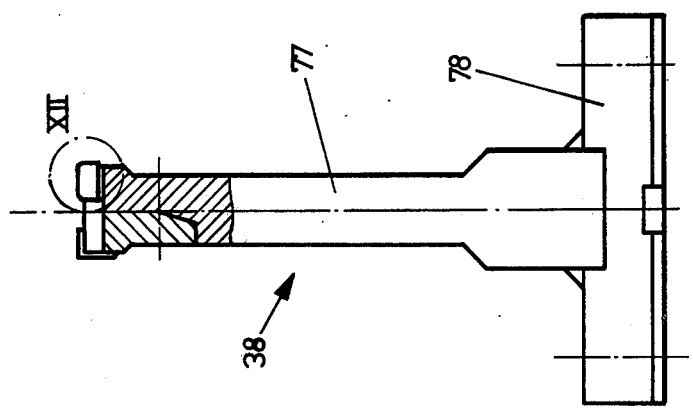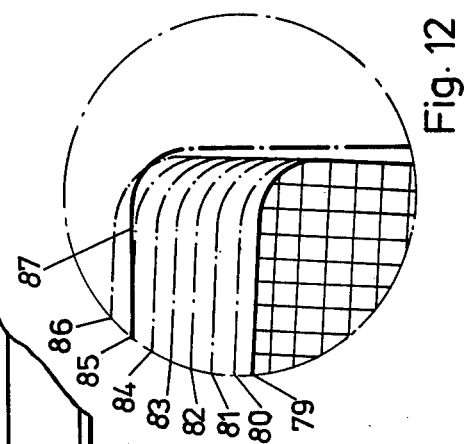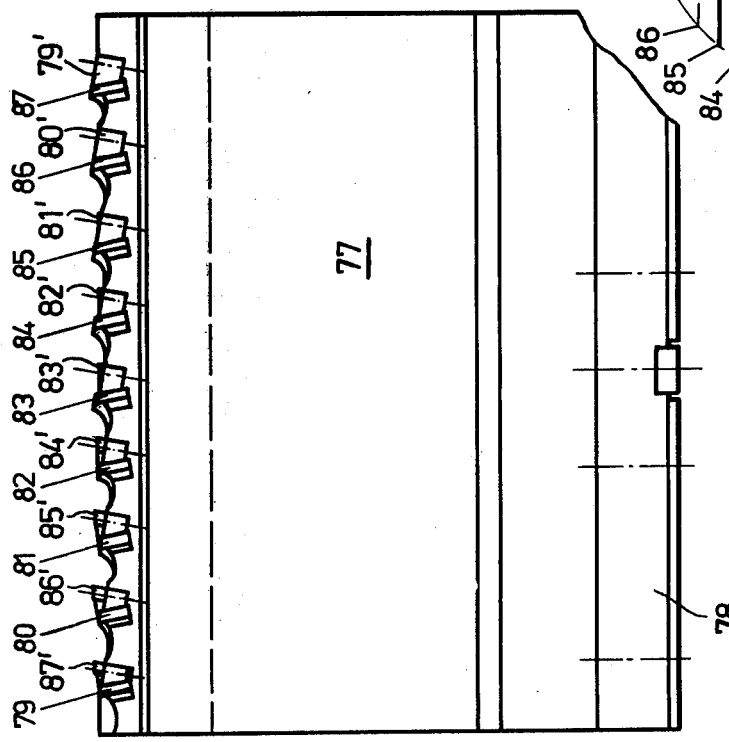

METHOD OF MACHINING WINDING SLOTS OF GENERATOR ROTORS

This is a division of application Ser. No. 560,177, filed 19 Mar. 1975, now U.S. Pat. No. 4,056,034.

BACKGROUND OF THE INVENTION

The invention relates to the manufacturing of rotors for electrical generators and more particularly to a method and apparatus for cutting out the slots for receiving the rotor windings.

The procedure for cutting the rotor winding slots out of the rotor is that for each winding groove a slot is first cut having parallel, possibly stepped walls out of the rotor block by means of a side mill cutter. The final groove form is subsequently worked out by finishing the slot walls. If the groove walls are also to be parallel in their final form, this finishing is limited to the working out of so-called locking grooves; however, a considerably more extensive finishing is necessary with modern generator rotors because the grooves typically have "conical" walls, i.e., walls which approach each other are used, and in many cases even grooves having conical and undercut walls are provided.

The finishing is actually made in different ways depending on the form of the grooves. Purely conical grooves are finished with a conical side mill cutter, whereas undercuts, including the locking groove, are cut by means of shank-type milling cutters. This procedure has many essential disadvantages. The work with shank-type milling cutters is quite time consuming because such cutters allow only a relatively low cutting speed and because the cutter is able to work at only a relatively low advance speed since it can only have a small shank diameter at a relatively great length. Because of this length to diameter requirement, it is very unstable in spite of having a rigid support. It is true that this disadvantage does not apply to conical side mill cutters, but in the case of such cutters the dressing of a worn tool is extremely time consuming.

To overcome these disadvantages it has already been proposed to treat winding slots of generator rotors by planing. This technique, however, could not be introduced in actual practice. The planing technique generally used is not applicable to the treatment of winding slots of generator rotors because modern generator rotors weigh several hundred tons. If such heavy workpieces are moved at the relatively high speed necessary for planing, considerable distances and periods of time and forces are required to slow down the workpiece. At normal planing, only one cutting edge is engaged at a time and many steps are necessary until the slot is worked out so that the problem of slowing down becomes even more important. In the case of conical slots, it is additionally required that the conical slot wall and the conical part of the slot wall, respectively, must be free from steps. This can be achieved only with very careful control of the planing machine. As the treatment of the winding slot of a generator rotor would take several weeks, an operating error or even a minor inadvertence may possibly destroy the work of several weeks. Even if the probability of an operating error or an inadvertence is quite minor, the damage which is likely to be caused is so important that in a practical sense the planing of winding slots of generator rotors could not be introduced.

SUMMARY OF THE INVENTION

The above and other disadvantages of the prior art method and apparatus are overcome by the present invention of a method and apparatus for finish machining winding slots of generator rotors comprising holding the workpiece stationary, and guiding repetitively and linearly over the slot wall a tool having a plurality of cutting edges disposed linearly one behind the other and displaced with respect to each other by one depth of cut. The depth the tool extends into the slot as well as the depth the tool penetrates vertically to the slot walls is adjusted by copying means.

Because the finish machining is done on a stationary workpiece, the above mentioned problems of the prior art planing procedure of slowing down the workpiece are avoided. Since a tool having a plurality of cutting edges is used, the number of strokes to be carried out until a certain depth is obtained is reduced. Furthermore, because the cutting edges of the tool are disposed linearly one behind the other and displaced with respect to each other by one depth of cut, the maintenance of the tool only requires a relatively short period of time. Since the depth the tool extends into the slot as well as the depth the tool penetrates vertically to the slot walls are controlled by copying means, an important objection to the planing technique, i.e., the risk of operating errors, is avoided.

The tool used in the method and apparatus according to the invention comprises a plate-shaped support having at one longitudinal rim a plurality of cutting edges which are displaced by one depth of cut vertically with respect to the cutting direction. For making undercuts the cutting edges are suitably displaced relative to a direction which is vertical to the plane of the plate. For the treatment of conical walls, the cutting edges are displaced with respect to a direction parallel to the plane of the plate. With such a tool it is possible to remove a number of chips equal to that of the cutting edges so that in one stroke of the tool a multiple of a depth of cut is worked out somewhat analogously to a milling process.

Multiple planing tools are known per se; however, in these tools the cutting edges are not displaced relatively to each other so that the tool must be positioned obliquely for treatment. In another type of tool they are arranged in staggered relationship to each other so that treatment of a slot wall is impossible.

In the tool of the invention two rows of cutting edges are provided on the longitudinal rim of the plate which protrude in opposite directions from the plate. The cutting edges are directed in opposite directions so that it is possible to treat the first side of the winding slot during one stroke and the second side thereof during the reverse stroke. In this way, practically no idle strokes occur. It should be noted, however, that at the points of reversal of the tool support an adjustment of the tool holder is necessary with a certain amount of accuracy.

Because of the exacting requirements as to the quality of the finish machining of the winding slot walls, according to one specific embodiment of the invention there is provided an additional cutting edge at the end of the longitudinal rim of the plate of a tool facing away from the cutting edges. This additional cutting edge is displaced backwardly with respect to the cutting edge arranged in its immediate vicinity as seen in the feed or advance direction. It does, however, protrude in a direction perpendicular thereto with respect to the cutting edges. This additional cutting edge may be designated as a smoothing cutting edge which serves to smooth the machined surface and to remove possible burrs.

The cutting edges are preferably hard metal turnover plates. Such hard metal, turnover plates are known and they have the advantage that they may be used in various positions without loss in accuracy so that no regrinding of the tool is necessary if a cutting edge has become blunt.

The apparatus of the present invention further comprises clamping means for clamping the workpiece in a number of positions corresponding to the number of winding slots and a tool slide guided in the longitudinal direction with respect to the workpiece. The tool slide is designed to receive the above described tool having a plurality of cutting edges and the copying means. The copying means further include at least one template for controlling the depth the tool extends into the slot and the depth the tool penetrates vertically to at least one slot wall. An operating element is used to actuate the copying means and this operating element cooperates with a corresponding operating element on the guide at the respective end of the stroke to actuate the copying device.

Since axial forces occur during the milling operation, the clamping device supports the workpiece against longitudinal forces as well as holding the workpiece in the number of positions for cutting the winding slots. During the finishing process described above, the longitudinal forces are much greater than during the initial machining operation so that the clamping device is designed to withstand the considerably higher longitudinal forces.

In the course of finishing according to the method and apparatus in the invention, undercuts must sometimes be worked out so that another tool profile is required than the tool required for working out conical walls. In order to avoid a required change of tool in such cases, two tool slides are provided on one side of the workpiece according to one preferred embodiment of the invention. These two slides carry tools of different profiles, the first slide having a tool profile to effect the plunge-cutting operations and the other tool slide having a tool profiled to effect the working out of conical walls i.e., walls approaching each other. Under certain circumstances both tool slides may operate simultaneously so that the total period of machining may be considerably shortened.

In order to meet the exacting requirements as to reliability in cutting the winding slots, the copying means is of simple and sturdy construction and includes at least one template corresponding in its form to the slot. The template is arranged on the tool slide at a constantly adjustable distance from the workpiece. The template controls the depth the tool penetrates as a function of the depth it extends into the slot. A second template which is stepwise removable from the workpiece controls the depth of penetration when the depth the tool extends into the slot remains constant. In some cases in order to avoid idle strokes, tools having two rows of cutting edges are used for machining one side during one stroke and the other side of the slot during the reverse stroke. In such cases it is possible, due to mirror symmetry, to use but a first and a second template; however, in a simple and sturdy structure two uniform templates are preferably provided homologously.

Although various types of copying device drives are utilizable, such as hydraulic transfer mechanisms and electrical drives, in the preferred embodiment of the invention the drive needs to be actuated only in the beginning of a new stroke and remains stationary until the end of the stroke. The copying means are thus never actuated under stress so that a purely mechanical copying device drive is suitable for the purpose. Therefore, in accordance with one preferred embodiment of the invention, there are provided copying means actuated by actuating elements via a gearing including slip clutches.

As explained above, the milling of the parallel, possibly stepped slot walls is done in a conventional manner, and therefore this conventional milling operation may take more time than the finishing operation according to the invention. In order to conserve time, in one preferred embodiment of the invention the known milling slide is guided on one side of the workpiece facing away from the tool slide for the finishing tool described above, and this known milling slide effects the initial milling operation. In such an arrangement the finishing tool slide is sometimes not used until the initial machining operation has progressed to such an extent that the two milling operations may proceed simultaneously. This does have the advantage, however, that the workpiece needs only to be clamped once for both machining operations which gives great improvement in the accuracy of machining under identical conditions.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 10 is a plan view of a tool for utilization in a device of the type shown in FIGS. 1-9;

FIG. 11 is a lateral view of the tool depicted in FIG. 10; and

FIG. 12 is an enlarged view of the detail surrounded by the dot-dash line in FIG. 11.

DETAILED DESCRIPTION OF THE PREFERRED EMBODIMENTS

Figure 1:
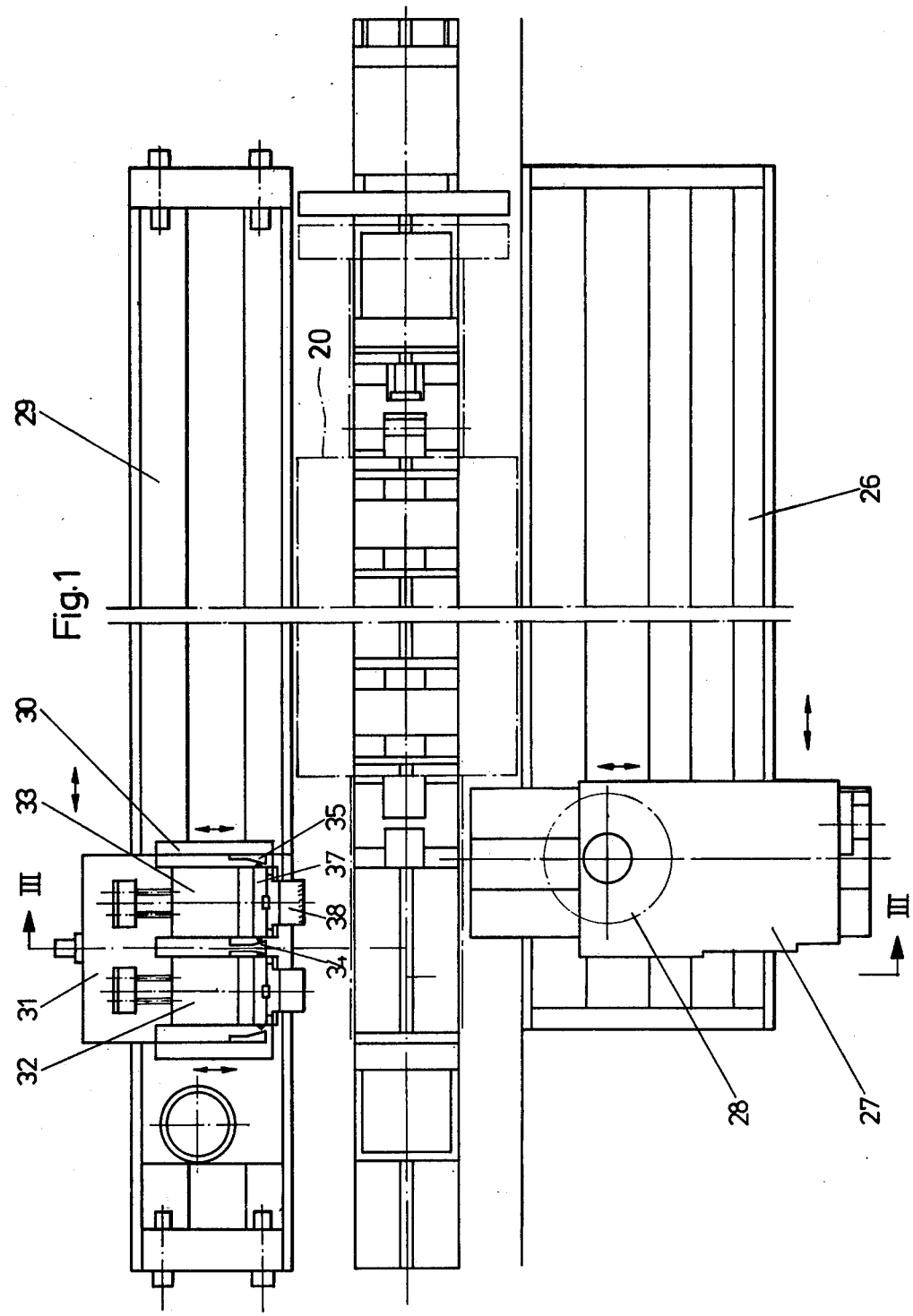
FIG. 1 is a plan view of the apparatus according to the invention.
Figure 2:
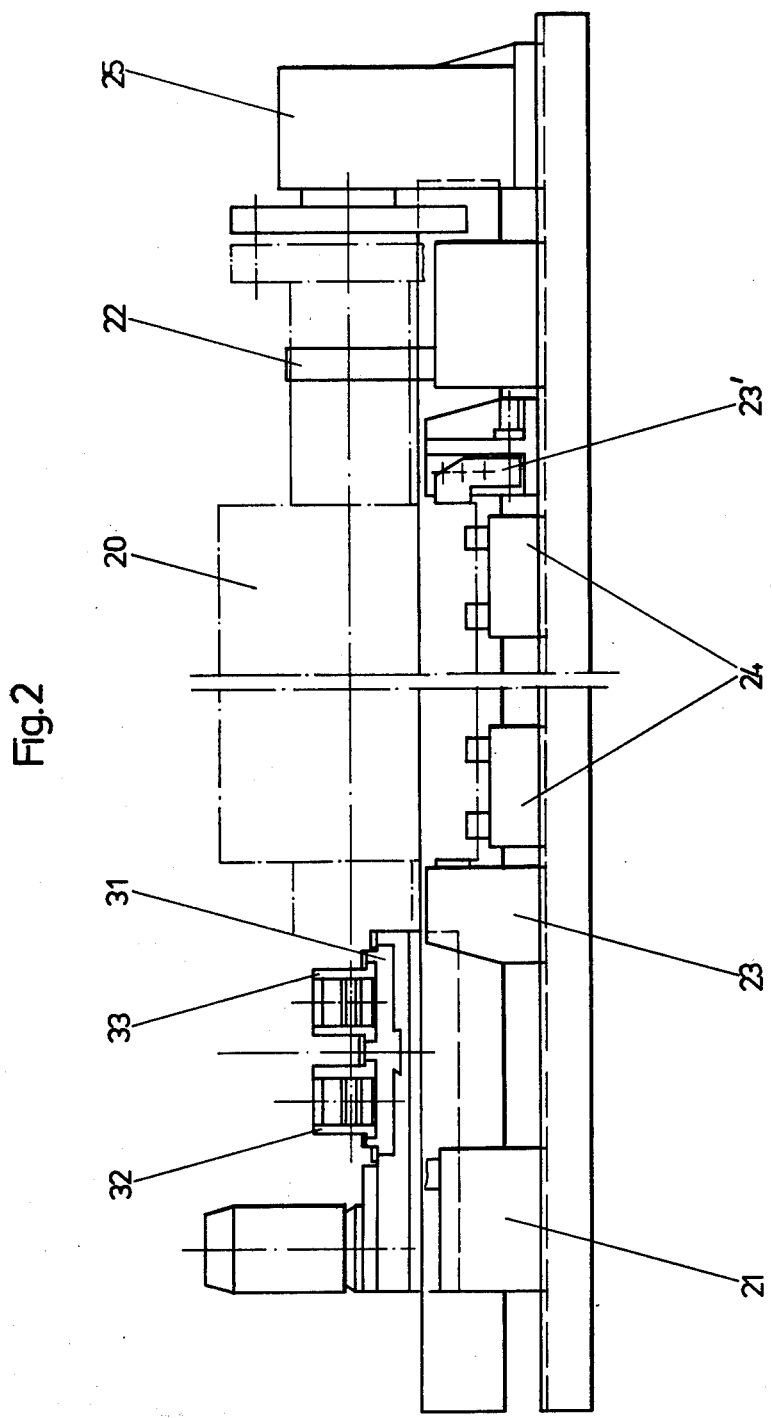
FIG. 2 is a sectional view taken generally along the line 2—2 in FIG. 3.
Figure 3:
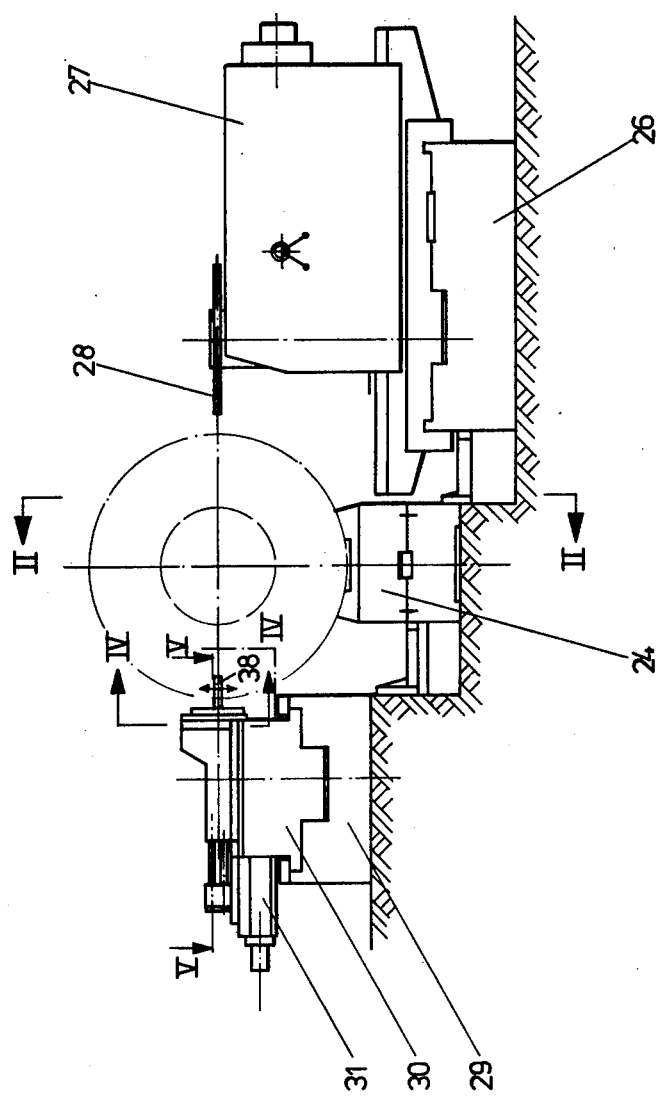
FIG. 3 is a sectional view taken generally along the line 3—3 in FIG. 1.

Referring now more particularly to FIGS. 1, 2 and 3, a combined device for carrying out the method according to the invention is illustrated. The generator rotor 20 is shown in dash-dot lines and the generator rotor is held by holding means including two clamping blocks 21 and 22, two support means 23 and 23' for taking up longitudinal forces, as well as several other support blocks shown generally at 24 which prevent sagging of the rotor 20. There is further provided an indexing device 25 which serves to accurately adjust the rotor 20 in various rotational positions where winding slots are to be provided. On one side of the holding means 21 through 24, inclusive, there is provided a guide 26 for a milling slide 27 which carries a side mill cutter 28.

On the opposite side of the holding means 21 through 24, as viewed in FIG. 3, there is provided a guide 29 which is shifted upwardly with respect to the guide 26 and which carries a tool slide 30. The tool slide 30 is slidable in the longitudinal direction relative to the length of the rotor 20 on the guide 29 and carries a cross slide 31 which is slidable toward or away from the rotor 20. Two tool holder slides 32 and 33 having the same structure are arranged on the cross slide 31. Since they are arranged in substantially the same manner only the arrangement of the tool holder 33 will be described hereinafter. Both of the tool holder slides 32 and 33 are slidable on the cross slide 31 toward or away from the rotor 20. On both sides of each of the tool holder slides 32 and 33 templates 34 and 35, respectively, are provided on the cross slide 31 which cooperate with copying feelers 36, to be described in greater detail hereinafter in reference to FIG. 4.

On the side of the apparatus facing the rotor 20, as viewed in FIG. 1, the tool holder slide 33 has a vertical slide 37 for holding a tool 38 clamped therein. The tool 38 will be described in greater detail hereinafter in connection with FIGS. 10 through 12.

Figure 4:
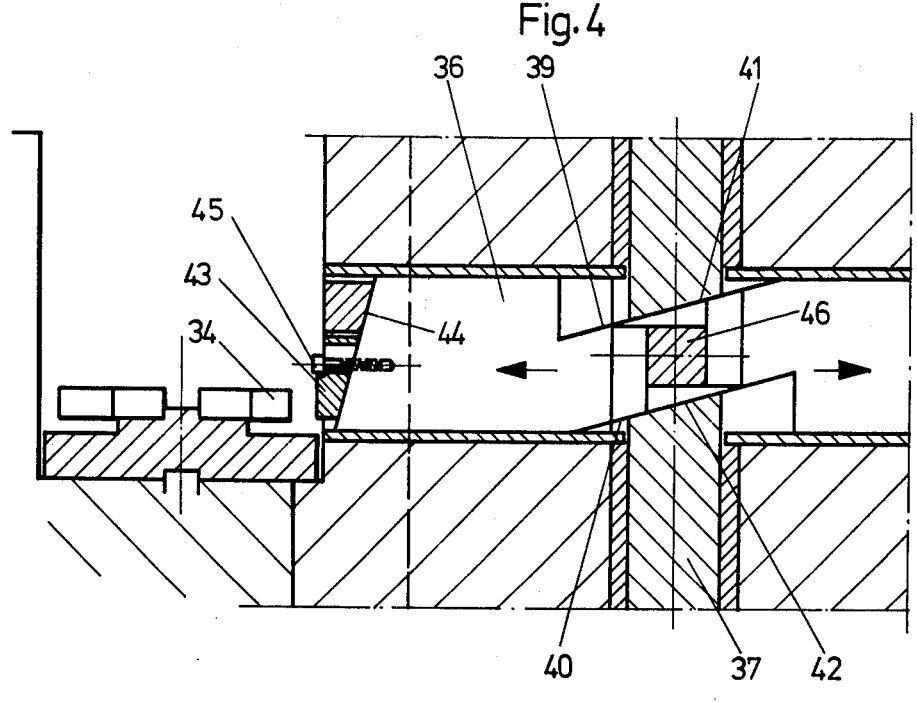
FIG. 4 is a sectional view taken generally along the line 4—4 in FIG. 3.
Figure 5:
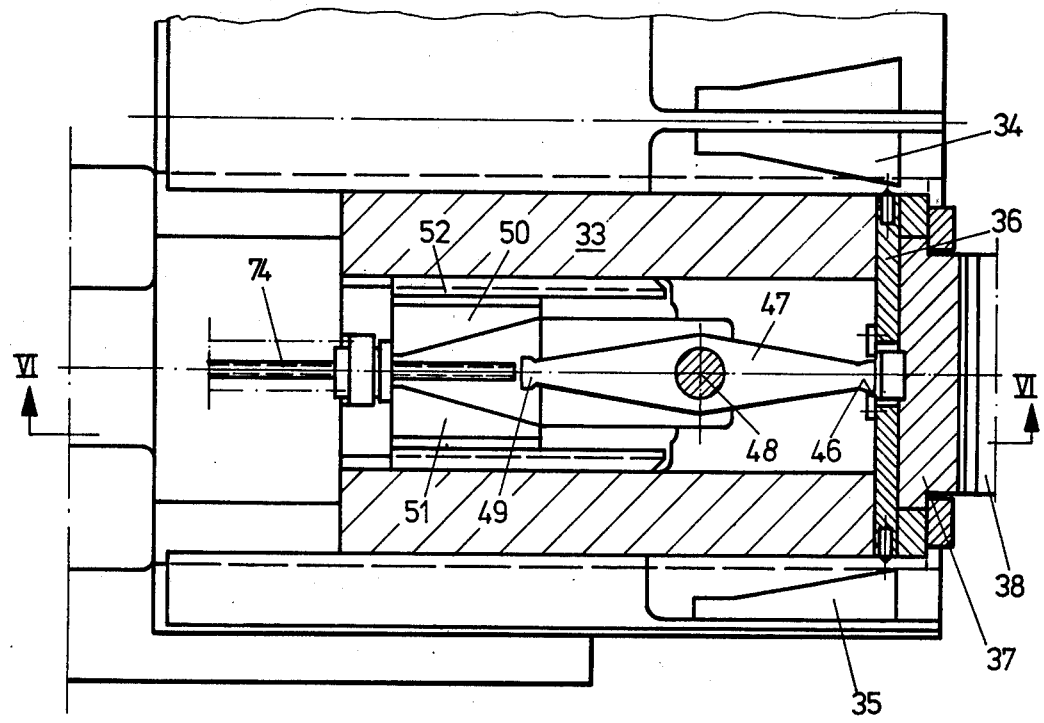
FIG. 5 is a sectional view taken generally along the line 5—5 in FIG. 3.

Referring now more particularly to FIGS. 4 and 5, the copying feeler 36 is slidable parallel to the rotor 20. It comprises two inclined planes 39 and 40 along which may slide respective inclined planes 41 and 42 of the vertical slide 37. The angle of the inclined planes with respect to the direction of motion of the copying feeler 36 is selected such that a displacement of the copying feeler 36 in one direction corresponds to a substantially lesser displacement of the vertical slide 37 in the vertical direction.

On each of its external faces the copying feeler 36 carries an abutment 43 allowing it to abut the template 34. For precise adjustment this abutment 43 is displaceable on an inclined plane 44 which is approximately normal to the direction of motion of the copying feeler 36. The abutment 43 is held in its adjusted position by means of a screw 45 threaded into the copying feeler 36.

The copying feeler 36 has an aperture 46 in its center into which a two-armed lever 47 is extendable. The two-armed lever 47 is pivotable at 48 on the tool holder slide 33 as is best seen in FIG. 5. Two templates 50 and 51 are movable into the path of the free end 49 of the double lever 47 and these templates are arranged on slide 52.

Figure 6:
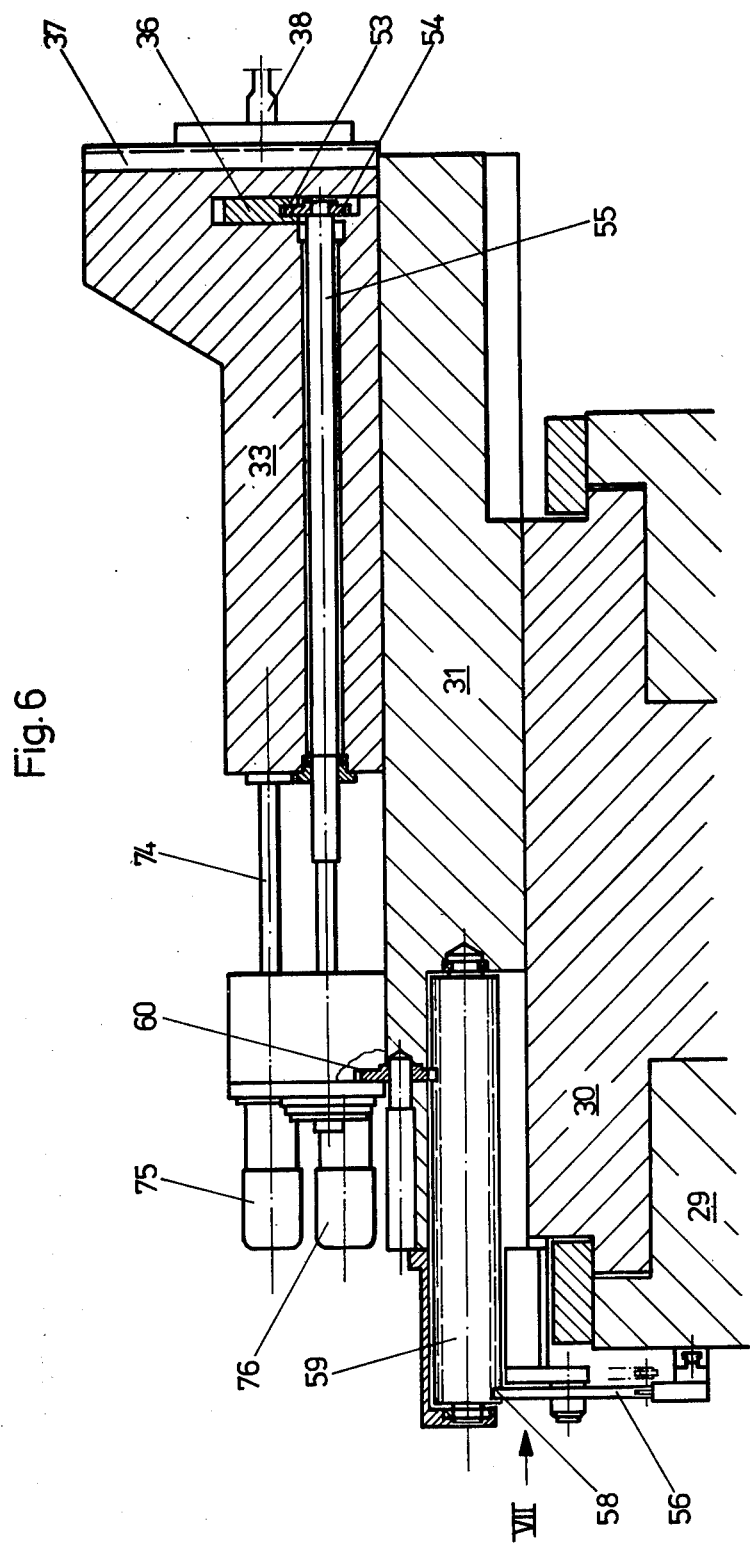
FIG. 6 is a sectional view taken generally along the line 6—6 in FIG. 5.

As best seen in FIG. 6, the underside of the copying feeler 36 has a toothed rack 53 which is engaged by a pinion gear 54 mounted on a shaft 55. The shaft 55 is rotatably mounted within the tool slide 33 and is coupled via gearing, which will be described in greater detail hereinafter with respect to FIGS. 7 through 9, to a roller lever 56 pivotable on the tool slide 30. As best viewed in FIGS. 6 and 7, a stop 57 disposed at the guide 59 at the end of the longitudinal path of the tool slide 30 is in the path of the roller lever 56. The roller lever 56 has a toothed wheel section 58 at its upper end which meshes with a toothed roller 59 which is journalled in the cross slide 31. On the other side of the toothed roller 59 an idle gear 60 meshes with it, the idle gear 60 also being journalled in the cross slide 31. The idle gear 60 meshes with a further idle gear 61 which is coupled via a slip clutch 62 (FIG. 9) to the shaft 55 having the gear 54 at its other end.

Figure 7:
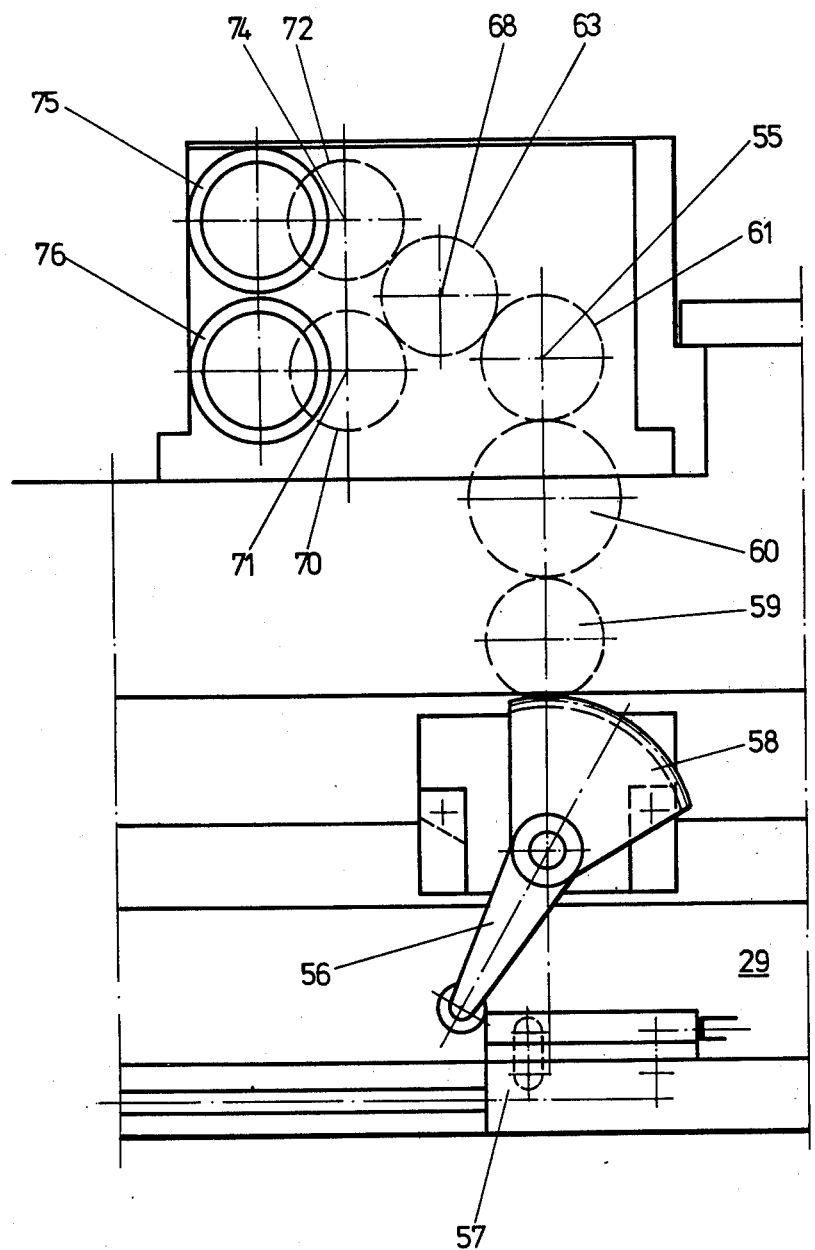
FIG. 7 is a vertical view, in elevation, taken in the direction of the arrow VII in FIG. 6 and with portions broken away.
Figure 8:
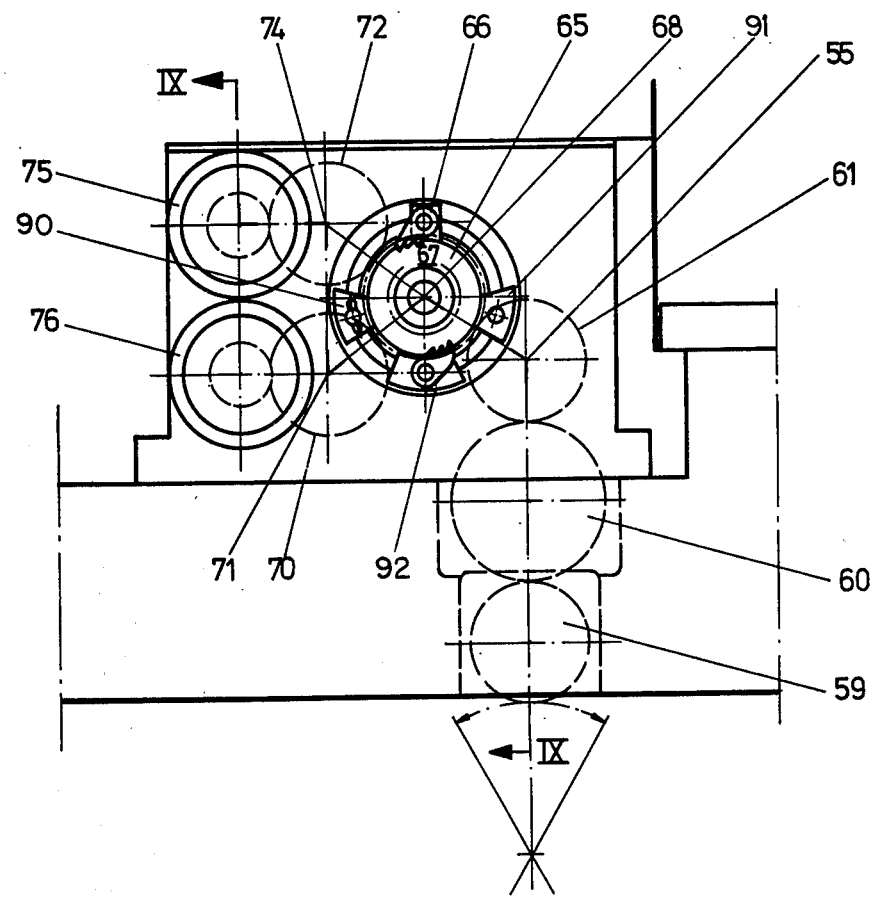
FIG. 8 is a more detailed view of the upper portion of the gearing according to FIG. 7.
Figure 9:
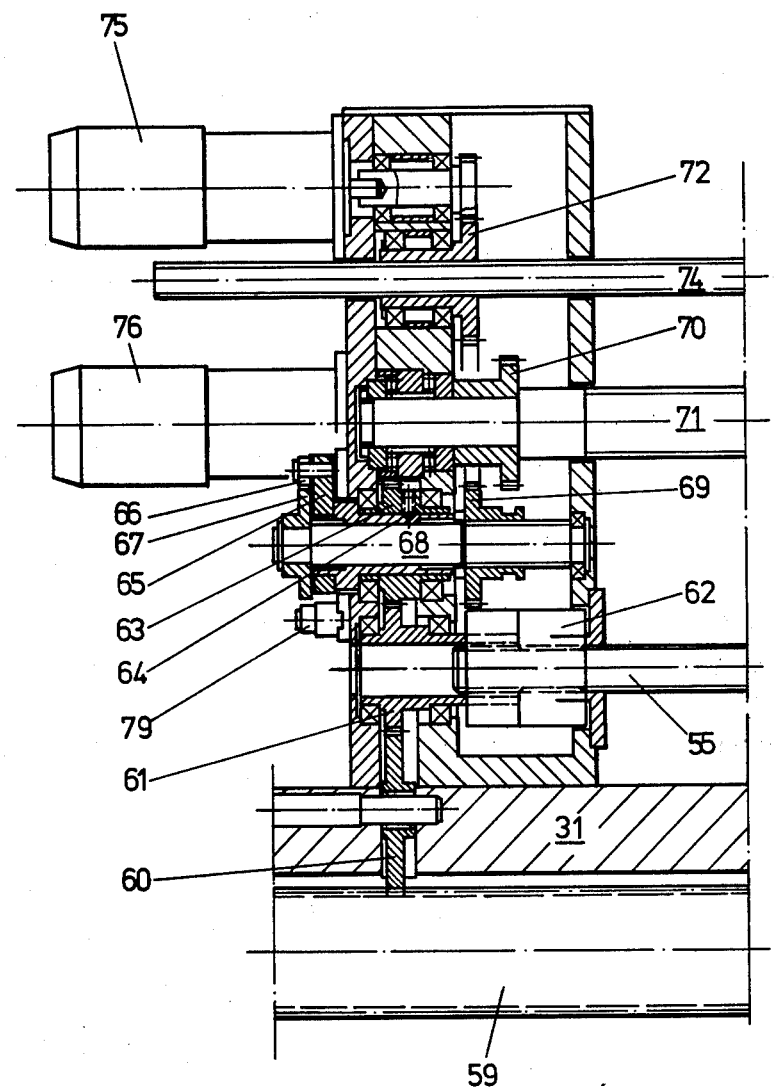
FIG. 9 is a vertical view, in section, taken generally along the line 9—9 of FIG. 8.

Referring now more particularly to FIGS. 7 to 9, the side of the gear 61 which is opposite to the gear 60 engages with a further gear 63 which is coupled via a spring loaded ball 64 to a pawl flange 65. The pawl flange 65 carries a pawl 66 which engages a ratchet wheel 67 mounted on a shaft 68 which extends through the pawl flange 65. The shaft 68 carries an axially displaceable gear 69. The gear 69 may selectively mesh with a gear 70 mounted on a longitudinal advance screw 71 or, as better shown in FIG. 9, it may mesh with a further gear 72 coupled to a transverse advance screw 74. The shaft 68 is rotatably mounted on an upstanding portion of the slide 31. The gear 72 further meshes with the driving pinion of a drive motor 75. The gear 70 of the longitudinal advance screw 71 also meshes with the driving pinion of a further drive motor 76.

Two limit stops 90 and 91 are provided in the path of the pawl wheel 65. A pawl 92 is provided on the slide on the side opposite the pawl 66 to prevent back rotation of the ratchet wheel 67 (see FIG. 8).

In the usual manner, and therefore not shown in greater detail, the longitudinal advance shaft 71 serves to move the tool holder slide 33 on the cross slide 31. The transverse advance shaft 74 serves to move slide 52, carrying templates 50 and 51 on the slide 33.

The tool 38 illustrated in the FIGS. 10 to 12, comprises a plate shaped support 77 having at one longitudinal edge thereof a mounting flange 78 and at the other longitudinal edge a plurality of cutting edges, which, in the embodiment shown in FIG. 10, comprises a first row of nine hard metal turnover plates numbered 79 to 87, respectively, and a second, adjacent row of nine hard metal turnover plates numbered 79' to 87', respectively.

The row of cutting edges 79 to 87 face in the opposite direction to the row of cutting edges 79' to 87' and the two sets of teeth are respectively displaced by one depth of cut. As best shown in FIG. 12 the last turnover plate 87 with respect to the advance direction is placed to the rear with respect to the preceding turnover plate 86 by approximately one depth of cut and the cutting edge 87 protrudes at the same time laterally to some extent so that it may smoothen roughness left from the preceding turnover plate 86 and any possible burrs. For the sake of clarity, the turnover plate 87 is shown in dark lines and the other cutting edges are shown in dot-dash lines in the drawing.

The displaced position of the cutting edges of the turnover plates 79 to 87, as in FIG. 12, is, of course, taken in the advance direction, that is if advance is effectuated in the longitudinal direction by displacement of the tool holder slide 33, the cutting edges as in FIG. 12 are displaced out of the support 77. On the other hand in plunge-cutting operations, as will be explained in greater detail hereinafter, the displacement is vertical with respect to the plane of the support 77.

In operation, the rotor 20 is first clamped and then one or more winding slots are worked out by means of the side mill cutter 28 in the usual manner. Each pre-cut slot is subsequently positioned in front of the tool slide 30 by rotating the rotor 180°. In the preferred embodiment the pre-cut slot is immediately positioned in front of the tool slide 30 after being cut by the side mill cutter 28. The tool slide 30 is adapted to the diameter of the rotor 20 by displacing the cross slide 31 which carries the two tool holder slides 32 and 33. In the case of rotors having a large diameter the cross slide 31 takes the position shown in FIG. 3 in full lines whereas with rotors of smaller diameter it takes the position illustrated in dot-dash lines in FIG. 3.

Before the beginning of the finish machining the tool holder slides 32 and 33 are in the fully retracted position. If a conical slot is to be machined, i.e., a slot of approximately trapezoidal cross section, only the slide 33 is operated; slide 32 is idling for a certain period of time. In the position of the tool slide 30 shown in FIG. 1 the copying feeler 36 is at its one extreme end position, that is, to the right in FIG. 4, and is limited by the template 34 so that the vertical slide 37, together with the tool 38, is in its lowermost position. When the slide 30 moves on the guide 29 along the workpiece 20, the tool 38 takes up corresponding chips which are blown out, for example, by means of compressed air, and these chips are thereafter removed in the usual way by means of a chip conveyor or the like. At the end of its forward travel, the roller lever 56 abuts the stop 57 at the guide 29 and rotates the toothed shaft 59 so as as to rotate the shaft 55 through the idle gears 60, 61 and to move the copying feeler 36 to its other extreme end position, where the abutment 43 abuts the template 34. Accordingly, the vertical slide 37 with the tool 38 is brought into its upper end position. The slip clutch 62 takes into account the possibility that the travel of the roller lever 56 will be too long.

During this time the pawl flange 65 is brought back into its end position (the right portion of FIG. 8) through the gear 63 and the ratchet wheel 67 is maintained in its position by the pawl 79 so that no further movement occurs at this point. Over travel of the roller lever 56 is consumed by the spring-loaded ball 64 releasing the pawl flange 65 in order to permit free rotation of the gear 63 on the pawl flange 65. Thus the upper slot flank is machined at the subsequent backstroke.

At the end of the backstroke the roller lever 56 abuts the stop 57 so that the described steps, i.e., the rotation of the shaft 55 and of the pawl flange 65, are repeated in the reverse direction. The vertical slide 37 is thus brought into its upper position limited by the abutment of the copying feeler 36 at the template 35. In this direction of rotation of the pawl flange 65 the pawl 66 engages with the ratchet wheel 67 to drive the gear 69. At this point the gear 69 meshes with the gear 70 to rotate the longitudinal advance screw 71 and thereby causing movement of the tool holder slide 33 toward the workpiece. In other words the tool 38 extends farther into the pre-cut slot. The slide 30 moves to and fro until the tool 38 has reached the bottom of the slot with the templates 34 and 35 causing the width of the slot to decrease toward the bottom.

The slide 33 is thereafter removed and the slide 32 is put into use. The slide 33 is equipped with a tool 38 having cutting edges which protrude laterally from the plate 37, whereas the slide 32 is provided with a tool having upper turnover plates 79 and 87 which extend perpendicularly from the plane of the plate 77. The profiles of the cutting edges of this tool correspond to the cross section of the locking groove. The gear 69 of slide 32 is brought into its neutral position so that it neither meshes with the gear 70 nor with the gear 72. The longitudinal screw 71 is subsequently rotated to such an extent that the slide 32 is advanced to the point that the cutting edges of the tool 38 reach the level of the locking groove to be worked out of the rotor 20. The transverse advance screw 74 is also rotated by means of the gear motor 75 to advance the slide 52 together with the templates 50 and 51 from the position shown in FIG. 5 to its forward end position. Subsequently, the gear 69 is advanced until it meshes with the gear 72.

Since the roller 56 in this position of the slide 30 is at one of its extreme end limit positions, the copying feeler 36 is also at its one end extreme position before the slide 52 is advanced. Advancement of the slide 52, however, causes the lever 47 to be returned to its intermediate positions so that it also returns the copying feeler 36, and thus the vertical slide 37 to its intermediate position. If it is desired not to have too large a return movement in order to avoid idle strokes at the beginning of the operation, either the space between the two templates 50 and 51 should be enlarged or the slide 52 should not be entirely moved into its end position.

When the tool slide 30 moves along the workpieces after these preliminary operations, the tool 38, possibly after some idle strokes, begins to work out the lower locking groove. At the end of its forward stroke the roller lever 56 again abuts against the stop 57 so that in the same manner as described in connection with the slide 33, the shaft 45 is rotated to bring the copying feeler 36 into its other extreme end position as limited now by the abutment of the free end 49 of the lever 47 against the template 51. Simultaneously the pawl 66 is returned to its right end position as viewed in FIG. 8. At the end of the next stroke when the roller lever 56 abuts the stop 57, the vertical slide 37 is again moved downwardly by means of the shaft 55, but the ratchet wheel 67, however, is rotated simultaneously so as to rotate the transverse advance screw 74 through the gear 69 and the gear 72. The transverse advance screw 74 retracts the slide 52 so that the template 50 allows the lever 47 the copying feeler 36, and the vertical slide 37 to reach a greater amplitude so that the tool 38 is brought closer to the bottom and continues to work out the locking groove. These operations are repeated until the locking groove is completely worked out.

In order to shorten the machining time, the slides 32 and 33 can be operated simultaneously. Since the working out of the locking groove takes considerably less time than the working out of the conical slots, the periods during which the slide 32 is operative are selected to fall during periods in which the slide 33 is only required to remove lesser amounts of material so that the drive motor 89 and the associated feed gearing do not need to be of an extremely heavy construction.

If a slot form requires undercuts, the above described procedure is altered in so far that at first the undercut is worked out with the slide 32 and the corresponding tool 38 to enable the slide 33 to operate with a corresponding tool 38 in the above described manner. In this situation the slide 32 is at first operated individually until the undercut is worked out and after this preliminary step the above described procedure is carried out.

It is evident that many variations of the above described embodiment of the invention and of the mode of its operation are possible. For example, if an electronic control is used, it is possible to drive the longitudinal advance screw 71 and the transverse advance screw 74 only by gear motor 76 or 75 with the electronic control governing the speed of the motor 75 and 76. Hydraulic control means may also be used and the transmission may be made to operate electrically or hydraulically. Furthermore, instead of the milling slide 27, and additional tool slide may be provided having a structure substantially identical to that of the tool slide 30 so that the total period of machining the rotor 20 may be cut in half. In this embodiment it is, however, necessary to do the preparatory milling on a separate machine.

It is also possible to use tools having but one row of cutting edges. Both the slides 32 and 33 in such case can be designed such that the first one treats the lower slot flank and the second one treats the upper slot flank. The advantage of such a design resides in the fact that it is not necessary to readjust the vertical slide 37 at the end of one stroke but it is only necessary to advance it at the beginning of one stroke, thereby simplifying the controls.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. An improved method of machining winding slots in generator rotors, wherein the method is of the type in which each slot is first cut out of a solid rotor block workpiece by means of a side mill cutter, each slot having parallel walls, and then the final groove form is worked out by finishing the slot walls, wherein the improvement comprises finishing the slot by the steps of
holding the workpiece at rest,
planing each workpiece slot while the workpiece is held at rest, with a tool having a plurality of cutting edges for the forward and backward strokes of the tool, said edges are disposed in two rows lineraly one behind the other and displaced with respect to each other by one depth of the cut for the forward and backward strokes of the tool, the tool including a plate shaped support having a longitudinal edge on which the cutting edges are carried, said planing operation including finishing one side of said slot during the forward stroke of the tool and finishing the other side of said slot during the backward stroke of the tool, and
controlling both the depth of which the tool extends into the slot and the depth of penetration of the tool perpendicularly into the slot walls by means of a copying device.

* * * * *